US012693610B2

(12) United States Patent
Yoshida

(10) Patent No.: US 12,693,610 B2
(45) Date of Patent: Jul. 28, 2026

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Shingo Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 56 days.

(21) Appl. No.: 19/009,444

(22) Filed: Jan. 3, 2025

(65) Prior Publication Data

US 2025/0224687 A1 Jul. 10, 2025

(30) Foreign Application Priority Data

Jan. 10, 2024 (JP) ................................ 2024-001952

(51) Int. Cl.
*G03G 15/04* (2006.01)
*G03G 21/00* (2006.01)

(52) U.S. Cl.
CPC ... *G03G 15/04072* (2013.01); *G03G 21/0005* (2013.01); *G03G 2215/0404* (2013.01); *G03G 2221/1627* (2013.01); *G03G 2221/1636* (2013.01); *G03G 2221/1648* (2013.01)

(58) Field of Classification Search
CPC ............ G03G 15/04; G03G 15/04036; G03G 15/04072; G03G 2215/0402; G03G 2215/0404; G03G 2221/1636
See application file for complete search history.

(56) References Cited

U.S. PATENT DOCUMENTS

| | | | | |
|---|---|---|---|---|
| 2012/0287454 | A1 | 11/2012 | Arimura | 358/1.13 |
| 2016/0033890 | A1 | 2/2016 | Sumikura et al. | B41J 2/385 |
| 2020/0033749 | A1* | 1/2020 | Kamata | G03G 15/04072 |
| 2020/0174417 | A1* | 6/2020 | Imai | G03G 15/011 |
| 2021/0011393 | A1* | 1/2021 | Yoshida | G03B 21/58 |
| 2024/0045354 | A1* | 2/2024 | Kawasaki | G03G 15/04072 |

FOREIGN PATENT DOCUMENTS

| | | | |
|---|---|---|---|
| JP | 2004-299882 | A | 10/2004 |
| JP | 2012-236696 | A | 12/2012 |
| JP | 2014-156344 | A | 8/2014 |
| JP | 2016-031467 | A | 3/2016 |

* cited by examiner

*Primary Examiner* — Thomas S Giampaolo, II
(74) *Attorney, Agent, or Firm* — Stein IP, LLC

(57) ABSTRACT

An optical scanning device includes a housing, a transmissive member, a linear member, a drive portion, a guide rail, a cleaning holder, a cleaning member, a detection portion, and a control portion. The detection portion includes a light emitter that emits light in a juxtaposition direction of the transmissive member and a light receiver that receives the light emitted from the light emitter. The cleaning holder includes a light blocking portion that is located, when the cleaning holder reaches one end part of a movement path thereof, between the light emitter and the light receiver so as to block the light emitted from the light emitter, with a gap formed between the light blocking portion and the housing. The housing includes a light leakage prevention portion formed between the light emitter and the light receiver.

8 Claims, 14 Drawing Sheets

OPTICAL SCANNING DEVICE AND IMAGE FORMING APPARATUS INCLUDING THE SAME

INCORPORATION BY REFERENCE

This application is based on and claims the benefit of priority from Japanese Patent Application No. 2024-001952 filed on Jan. 10, 2024, the contents of which are hereby incorporated by reference.

BACKGROUND

The present disclosure relates to an optical scanning device that is incorporated in an electrophotographic image forming apparatus so as to irradiate an image carrier with light to thereby form an electrostatic latent image, and also relates to an image forming apparatus including the optical scanning device.

Conventional optical scanning devices irradiate a charged image carrier with light so as to form an electrostatic latent image on the image carrier. An optical scanning device includes a housing, a transmissive member, a linear member, a drive member, a guide rail, a cleaning holder, a cleaning member, and a stopper.

In the housing, an emission port for laser light for irradiating the image carrier is formed to extend in a main scanning direction of the laser light. The transmissive member extends in the main scanning direction of the laser light and seals the emission port for the laser light. The linear member extends in an extending direction of the transmissive member. The guide rail is juxtaposed with the emission port so as to extend in the extending direction of the transmissive member.

The cleaning holder, which is coupled to the linear member, includes two cleaning holders that each move along the transmissive member as the linear member travels in a loop. The cleaning member, which is fixed to the cleaning holder, includes two cleaning members that each slide on the transmissive member along with the movement of the cleaning holder to thereby clean the transmissive member. The cleaning holder comes into abutment with a stopper at one end of a movement path thereof to thereby cause the linear member to stop traveling.

SUMMARY

According to one aspect of the present disclosure, an optical scanning device includes a housing, a transmissive member, a linear member, a drive portion, a guide rail, a cleaning holder, a cleaning member, a detection portion, and a control portion. The optical scanning device irradiates an image carrier with laser light so as to form an electrostatic latent image. In the housing, a laser-light emission port is formed to extend in a main scanning direction of the laser light so as to correspond to the image carrier. The transmissive member is transmissive with respect to the laser light, extends in the main scanning direction of the laser light, and seals the laser-light emission port. The linear member is stretched in a loop on the housing. The drive portion drives the linear member to travel in a predetermined direction. The guide rail is juxtaposed with the laser-light emission port so as to extend in the extending direction of the transmissive member. The cleaning holder is fixed to the linear member and, when the linear member is driven by the drive portion to travel, moves over the transmissive member along the guide rail. The cleaning member is fixed to the cleaning holder and slides with respect to the transmissive member along with movement of the cleaning holder to thereby clean the transmissive member. The detection portion is disposed on one side in the extending direction of the transmissive member so as to detect that the cleaning holder has reached one end part of a movement path of the cleaning holder. The control portion controls driving of the drive portion. The detection portion includes a light emitter that emits light in a juxtaposition direction of the transmissive member and a light receiver that receives light emitted from the light emitter, and the detection portion is disposed along the housing such that longitudinal directions of the light emitter and the light receiver are parallel to a movement direction of the cleaning holder. The cleaning holder includes a light blocking portion that is located, when the cleaning holder reaches the one end part of the movement path thereof, between the light emitter and the light receiver so as to block light emitted from the light emitter, with a gap formed between the light blocking portion and the housing. The housing includes a light leakage prevention portion formed between the light emitter and the light receiver.

DETAILED DESCRIPTION

Figure 1:
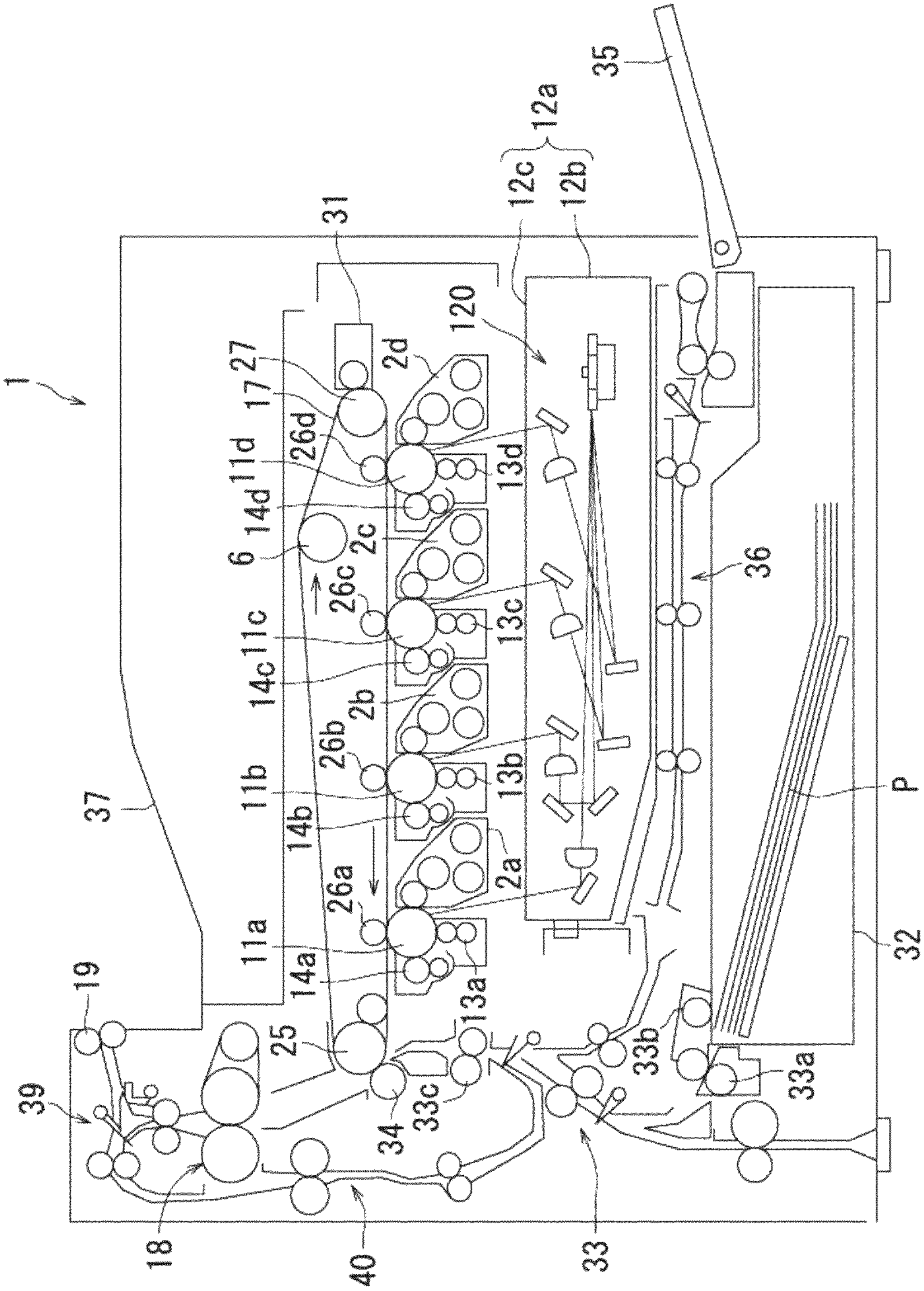
FIG. 1 is a sectional view schematically illustrating an overall configuration of an image forming apparatus incorporating an optical scanning device of the present disclosure.

Hereinafter, embodiments of the present disclosure will be described with reference to the accompanying drawings. FIG. 1 is a sectional view schematically illustrating an overall configuration of an image forming apparatus 1 incorporating an optical scanning device of the present disclosure. The image forming apparatus 1 is a tandem-type color printer. The image forming apparatus 1 includes photosensitive drums 11*a* to 11*d*, which are rotatable, as image carriers. Each of the photosensitive drums 11*a* to 11*d* is formed of, for example, an organic photosensitive member (an OPC photosensitive member) on which an organic photosensitive layer is formed or an amorphous silicon photosensitive member on which an amorphous silicon photosensitive layer is formed. The photosensitive drums 11*a* to 11*d* are disposed in a tandem manner respectively corresponding to colors of yellow, magenta, cyan, and black.

Around the photosensitive drum 11*a*, there are disposed a developing device 2*a*, a charger 13*a*, and a cleaning device 14*a*. Likewise, around the photosensitive drums 11*b* to 11*d*, there are disposed developing devices 2*b* to 2*d*, chargers 13*b* to 13*d*, and cleaning devices 14*b* to 14*d*, respectively. Furthermore, below the developing devices 2*a* to 2*d*, an optical scanning device 12 is disposed.

The developing devices 2*a* to 2*d* are each disposed on a right side of a corresponding one of the photosensitive drums 11*a* to 11*d*. The developing devices 2*a* to 2*d* each face a corresponding one of the photosensitive drums 11*a* to 11*d*, and each supply toner to the corresponding one of the photosensitive drums 11*a* to 11*d*. Herein, directions indicated as “right” and “left” refer to a rightward direction and a leftward direction in the drawings, respectively.

The chargers 13*a* to 13*d* are each disposed upstream of a corresponding one of the developing devices 2*a* to 2*d* with respect to a rotation direction of the corresponding one of the photosensitive drums 11*a* to 11*d*, and each face a surface of the corresponding one of the photosensitive drums 11*a* to 11*d*. The chargers 13*a* to 13*d* each uniformly charge the surface of the corresponding one of the photosensitive drums 11*a* to 11*d*.

Based on image data such as letters and patterns fed from a personal computer or the like to an image input portion, the optical scanning device 12 irradiates (optically scans), with light, the surfaces of the photosensitive drums 11*a* to 11*d* having been uniformly charged by the chargers 13*a* to 13*d*, as a result of which electrostatic latent images are formed on the surfaces of the photosensitive drums 11*a* to 11*d*.

The optical scanning device 12 has a housing 12*a* that includes an accommodation portion 12*b* having an opening in one surface thereof and a cover portion 12*c* covering the opening. The accommodation portion 12*b* has a scanning optical system 120 incorporated therein. In the cover portion 12*c*, emission ports 12*d* (see FIG. 4) for light (laser light) emitted from the scanning optical system 120 are formed so as to correspond to the photosensitive drums 11*a* to 11*d*, respectively. Furthermore, as will be described later, the emission ports 12*d* are each covered with a transmissive member 52. The transmissive member 52 is transmissive with respect to the light emitted from the scanning optical system 120.

The scanning optical system 120 includes a laser light source (unillustrated) and a polygon mirror. The scanning optical system 120 further includes at least one reflection mirror and a lens so as to correspond to each of the photosensitive drums 11*a* to 11*d*. The laser light emitted from the laser light source is applied, via the polygon mirror, the reflection mirrors, and the lenses, to the surface of each of the photosensitive drums 11*a* to 11*d* from a downstream side of a corresponding one of the chargers 13*a* to 13*d* with respect to the rotation direction of the corresponding one of the photosensitive drums 11*a* to 11*d*. In this manner, electrostatic latent images are formed on the surfaces of the photosensitive drums 11*a* to 11*d*. These electrostatic latent images are developed into toner images by the developing devices 2*a* to 2*d*.

An intermediate transfer belt 17, which is an endless belt, is stretched among a tension roller 6, a driving roller 25, and a driven roller 27. The driving roller 25 is caused by a motor (unillustrated) to rotate, and thereby drives the intermediate transfer belt 17 to circulate in a clockwise direction in FIG. 1.

The photosensitive drums 11*a* to 11*d* are arranged below the intermediate transfer belt 17 so as to be adjacent to each other along a conveyance direction (an arrow direction in FIG. 1). Furthermore, the photosensitive drums 11*a* to 11*d* are each in contact with the intermediate transfer belt 17. Primary transfer rollers 26*a* to 26*d* each face a corresponding one of the photosensitive drums 11*a* to 11*d* with the intermediate transfer belt 17 therebetween. The primary transfer rollers 26*a* to 26*d* are pressed against the intermediate transfer belt 17 to form primary transfer portions together with the photosensitive drums 11*a* to 11*d*, respectively. In these primary transfer portions, the toner images are transferred to the intermediate transfer belt 17. To be more specific, a primary transfer voltage is applied to each of the primary transfer rollers 26*a* to 26*d*, and thereby the toner images on the photosensitive drums 11*a* to 11*d* are sequentially transferred onto the intermediate transfer belt 17 with predetermined timing. In this manner, on a surface of the intermediate transfer belt 17, a full-color toner image is formed in which the toner images of four colors of yellow, magenta, cyan, and black are superimposed on each other in a predetermined positional relationship.

A secondary transfer roller 34 faces the driving roller 25 with the intermediate transfer belt 17 therebetween. The secondary transfer roller 34 is pressed against the intermediate transfer belt 17 to form a secondary transfer portion together with the driving roller 25. In this secondary transfer portion, a secondary transfer voltage is applied to the secondary transfer roller 34, and thereby the toner image on the surface of the intermediate transfer belt 17 is transferred onto a sheet P. After the transfer of the toner image, a belt cleaning device 31 cleans residual toner off the intermediate transfer belt 17.

A sheet feed cassette 32 is arranged on a lower side inside the image forming apparatus 1. The sheet feed cassette 32 accommodates a plurality of sheets P. On a right side of the sheet feed cassette 32, a stack tray 35 is arranged for manual sheet feeding. On a left side of the sheet feed cassette 32, a first sheet conveyance path 33 is arranged. The first sheet conveyance path 33 conveys a sheet P fed out from the sheet feed cassette 32 to the secondary transfer portion. Further, on a left side of the stack tray 35, a second sheet conveyance path 36 is arranged. The second sheet conveyance path 36 conveys a sheet fed out from the stack tray 35 to the secondary transfer portion. Moreover, a fixing portion 18 and a third sheet conveyance path 39 are arranged on an upper left side inside the image forming apparatus 1. The fixing portion 18 performs a fixing process on the sheet P having an image formed thereon. The third sheet conveyance path 39 conveys the sheet P having been subjected to the fixing process to a sheet discharge portion 37.

Sheets P stacked in the paper feed cassette 32 is fed out one by one by a pick-up roller 33*b* and a pair of separation rollers 33*a* toward the first sheet conveyance path 33.

The first sheet conveyance path 33 and the second sheet conveyance path 36 join together before reaching a pair of registration rollers 33*c* (on an upstream side of the pair of registration rollers 33*c*). The pair of registration rollers 33*c* convey a sheet P to the secondary transfer portion with timing coordinated with the image forming operation performed on the intermediate transfer belt 17 and the operation of sheet feeding to the secondary transfer portion. Onto the sheet P having been conveyed to the secondary transfer portion, the full-color toner image on the intermediate transfer belt 17 is secondarily transferred by the secondary transfer roller 34 having the secondary transfer voltage applied thereto. The sheet P having the full-color toner image transferred thereon is conveyed to the fixing portion 18.

The fixing portion 18 includes a fixing belt that is heated by a heater, a fixing roller that is internally in contact with the fixing belt, a pressing roller that is pressed against the fixing roller with the fixing belt therebetween, etc. The fixing portion 18 applies heat and pressure to the sheet P having the toner image transferred thereon. In this manner, the fixing process is performed. The sheet P having the toner image fixed thereon in the fixing portion 18 is turned upside down, as necessary, through a fourth sheet conveyance path 40. Thereafter, the sheet P is conveyed again to the secondary transfer portion via the pair of registration rollers 33*c*, and thereafter, a new toner image is secondarily transferred onto a back side of the sheet P by the secondary transfer roller 34 and is then fixed in the fixing portion 18. The sheet P having the toner image fixed thereon passes through the third sheet conveyance path 39 to be discharged by a pair of discharge rollers 19 into the sheet discharge portion 37.

Figure 2:
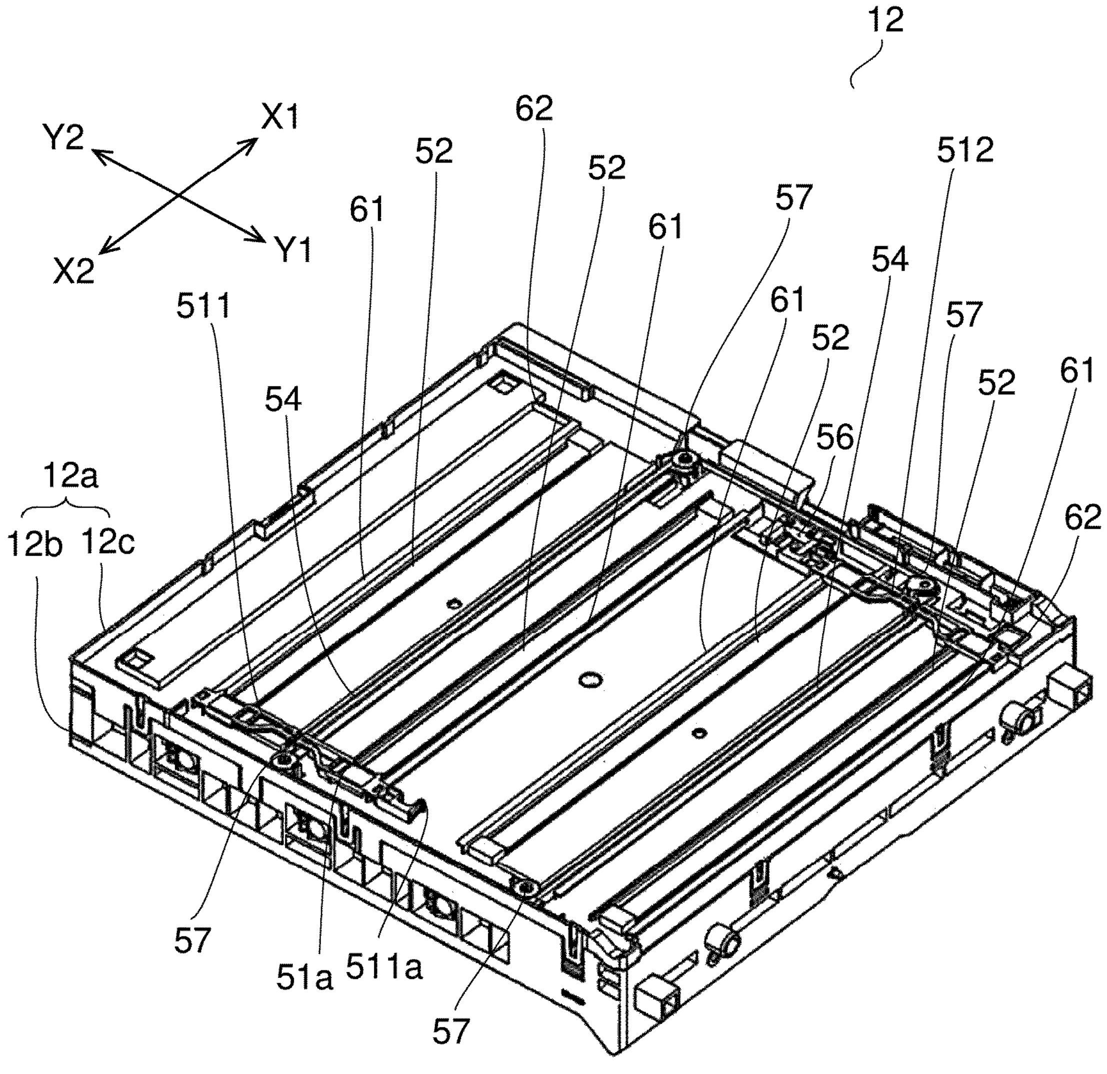
FIG. 2 is a perspective view of an optical scanning device according to a first embodiment of the present disclosure.
Figure 3:
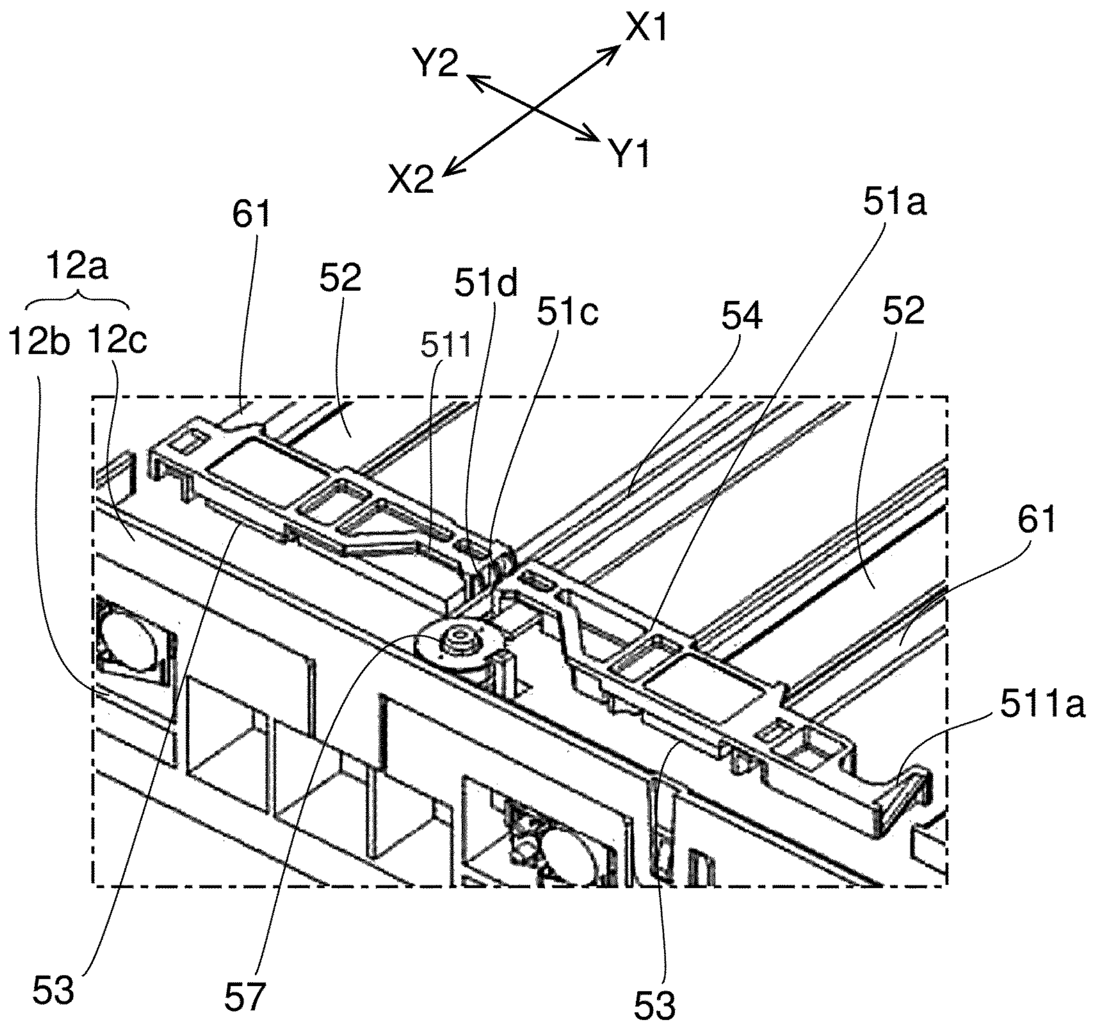
FIG. 3 is an enlarged perspective view of and around a cleaning holder fitted to a cover portion of the optical scanning device according to the first embodiment.
Figure 4:
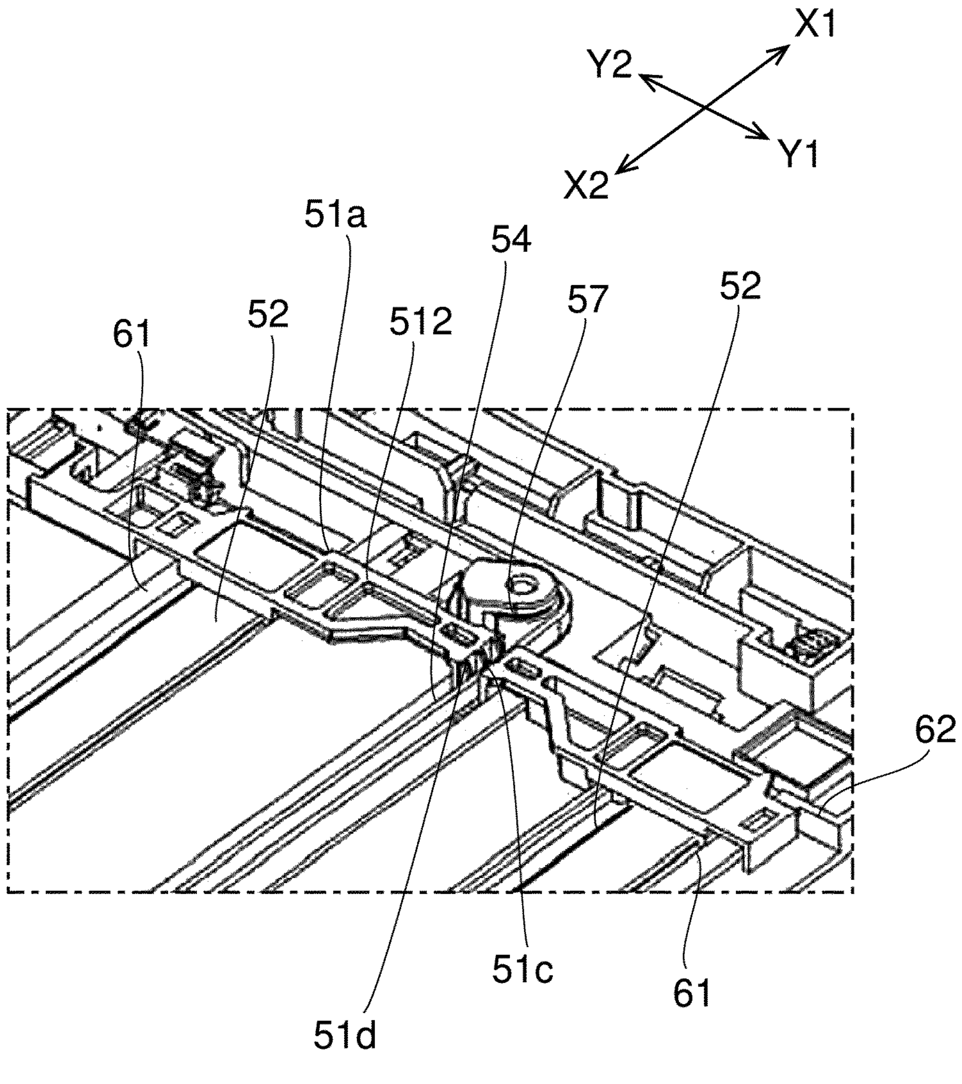
FIG. 4 is an enlarged perspective view of and around the cleaning holder fitted to the cover portion of the optical scanning device according to the first embodiment.
Figure 5:
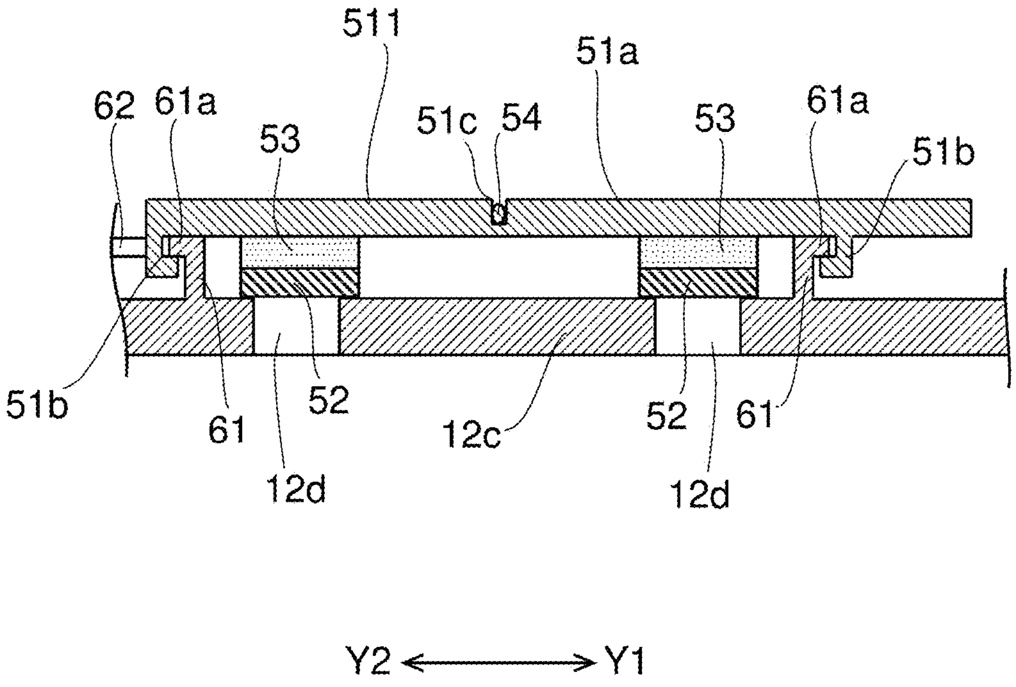
FIG. 5 is a sectional view of the cleaning holder fitted to the cover portion of the optical scanning device according to the first embodiment as seen from a movement direction of the cleaning holder.
Figure 6:
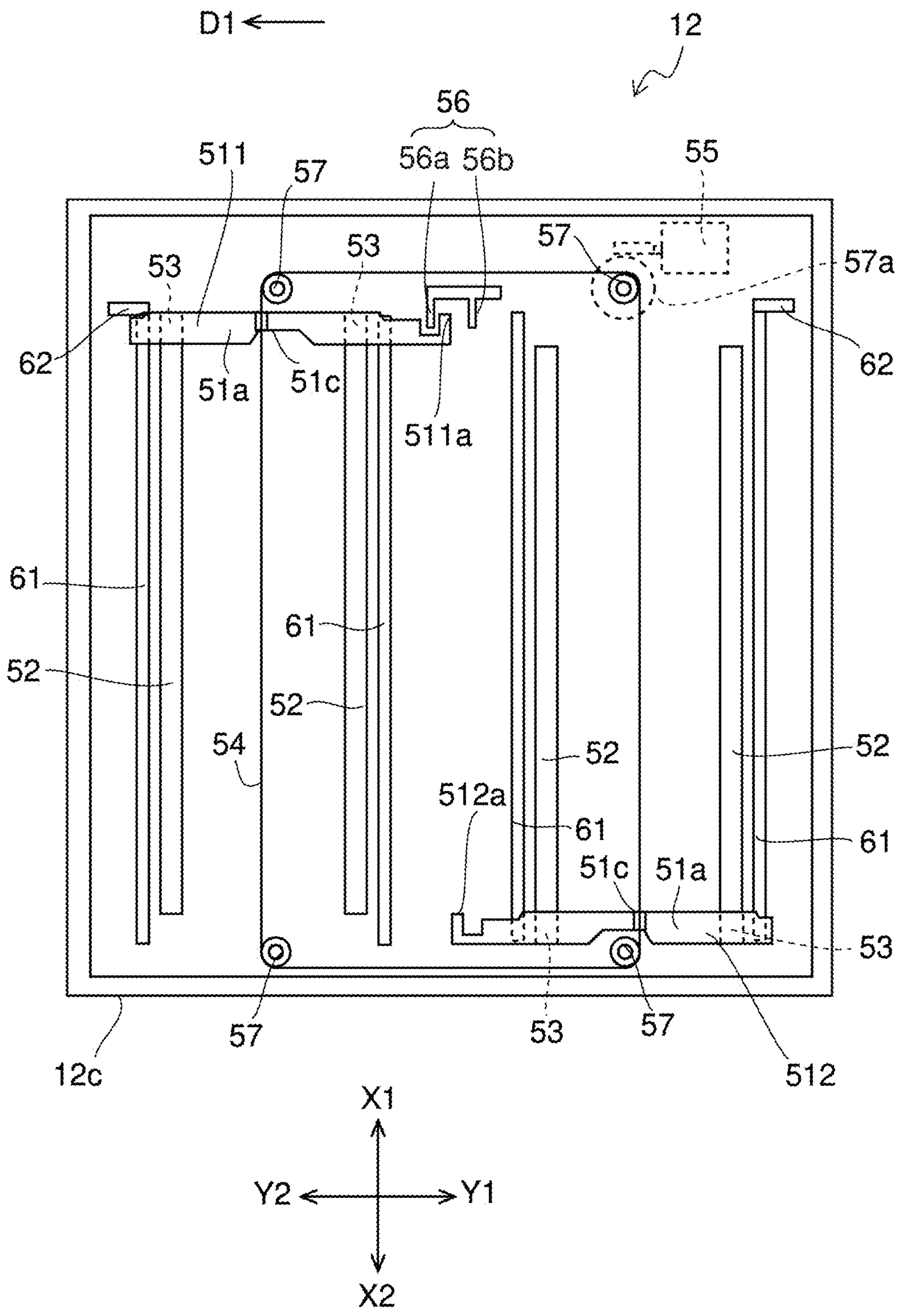
FIG. 6 is a plan view of the optical scanning device according to the first embodiment, illustrating a state where the cleaning holder has been detected by a detection portion.
Figure 7:
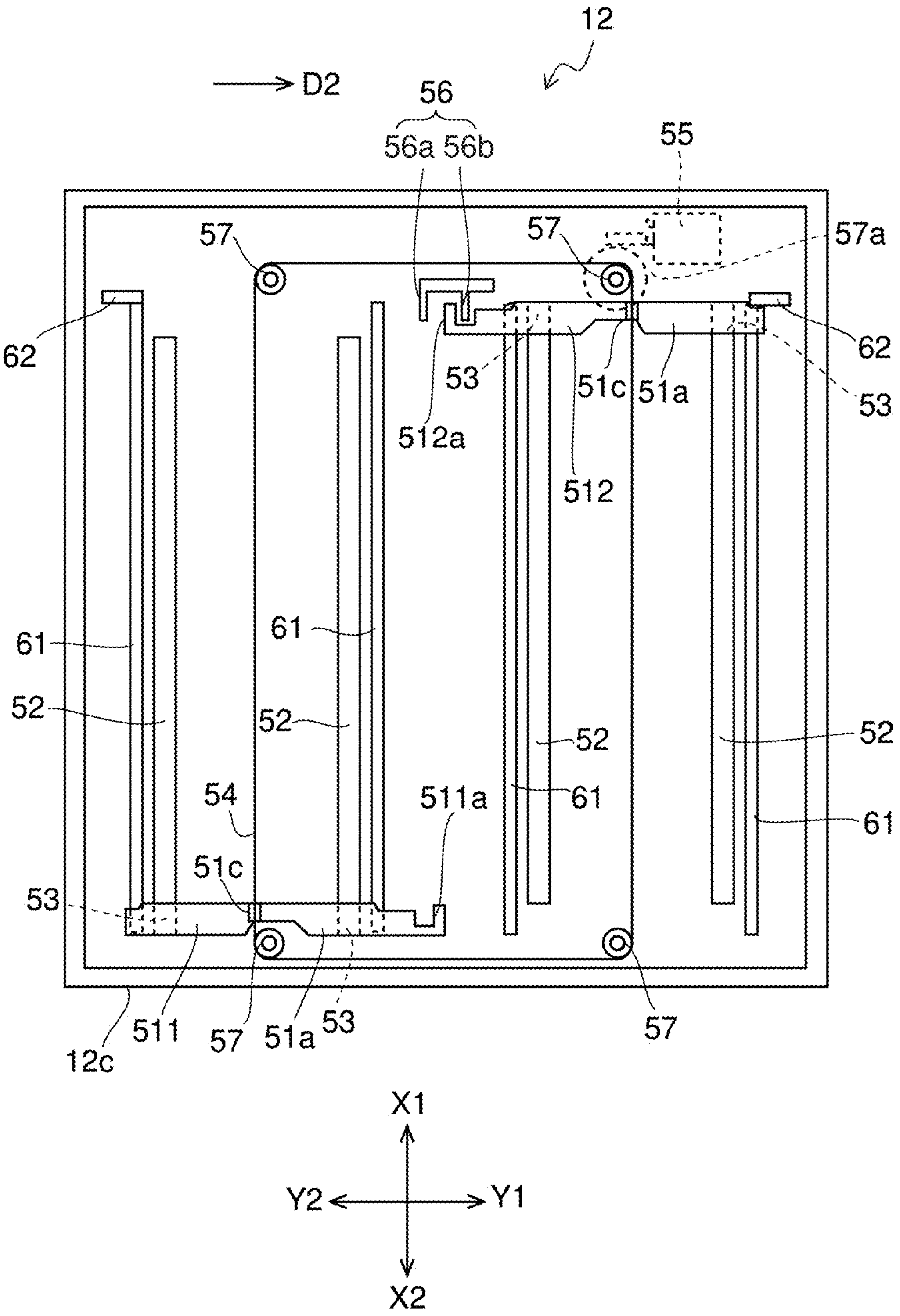
FIG. 7 is a plan view of the optical scanning device according to the first embodiment, illustrating a state where the cleaning holder has been detected by the detection portion.

Next, with reference to FIGS. 2 to 6, a description will be given of the optical scanning device 12. FIG. 2 is a perspective view of an optical scanning device 12 according to a first embodiment of the present disclosure. FIG. 3 and FIG. 4 are enlarged perspective views of and around cleaning holders 511 and 512, respectively, which are fitted to a cover portion 12*c* of the optical scanning device 12. FIG. 5 is a sectional view of the cleaning holder 511, which is fitted to the cover portion 12*c* of the optical scanning device 12, as seen from a movement direction of the cleaning holder 511. FIG. 6 and FIG. 7 are each a plan view of the optical scanning device 12.

In the drawings referred to below, an extending direction of the transmissive member 52 is referred to as direction X, X1 being one side in the extending direction of the transmissive member 52 toward a detection portion 56, X2 being the other side in the extending direction of the transmissive member 52 away from the detection portion 56. A juxtaposition direction of the transmissive members 52 is referred to as direction Y, Y1 being one side in the juxtaposition direction of the transmissive members 52, Y2 being the other side in the juxtaposition direction of the transmissive members 52. Further, descriptions will be given of shapes of, and a positional relationship among, the various portions assuming that the cleaning holder 511 and a cleaning holder 512 are positioned above the cover portion 12*c* as shown in FIG. 2. Note that an up-down direction is a term used only for description, and does not limit directions when the optical scanning device 12 is incorporated in the image forming apparatus 1.

Figure 10:
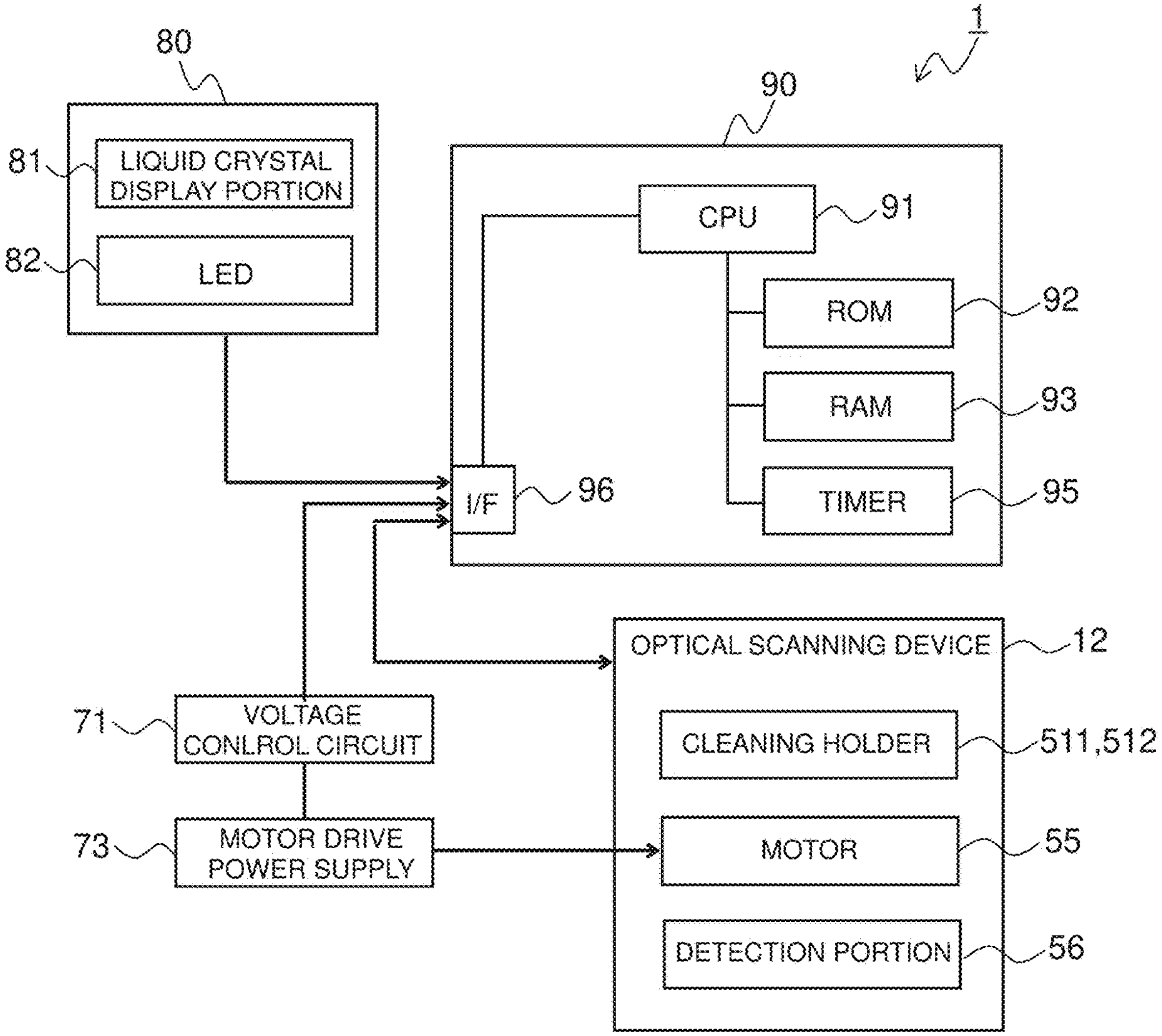
FIG. 10 is a block diagram illustrating an example of a control path used in the image forming apparatus.

The optical scanning device 12 includes a housing 12*a*, a transmissive member 52, a linear member 54, a motor (a drive portion) 55, a guide rail 61, a stopper 62, the cleaning holders 511 and 512, a cleaning member 53, a detection portion 56, and a control portion 90 (see FIG. 10).

The housing 12*a* includes an accommodation portion 12*b* and the cover portion 12*c* fitted to cover the accommodation portion 12*b*. In the cover portion 12*c*, four emission ports 12*d* (see FIG. 5) for laser light are juxtaposed with each other so as to correspond to the four photosensitive drums 11*a* to 11*d*, respectively. Each of the emission ports 12*d* has a rectangular shape elongated in the main scanning direction (direction X) of a corresponding ray of the laser light, and the emission ports 12*d* are formed such that longitudinal directions (direction X) thereof are parallel to each other.

The transmissive members 52 are formed in a rectangular plate shape, and each seal a corresponding one of the emission ports 12*d*. This makes it possible to prevent entry of toner, dust, and the like into the optical scanning device 12 through the emission ports 12*d*. The four transmissive members 52 are juxtaposed with each other such that their longitudinal directions (direction X) are parallel to each other. Each of the transmissive members 52 is a glass cover, for example.

As the guide rail 61, a pair of guide rails 61 are disposed one on each of opposite sides of each pair of the transmissive members 52, with the each pair of the transmissive members 52 therebetween. In short, four guide rails 61 are juxtaposed with each other. The guide rails 61 protrude from an upper surface of the cover portion 12*c* and extend in the extending direction (in direction X) of the transmissive members 52. The guide rails 61 have guide ribs 61*a*, one for each, protruding outward from leading ends of the guide rails 61 and extend in the extending direction (direction X) of the transmissive members 52 (see FIG. 5).

The stopper 62 is disposed on one side (side X1) in an extending direction of the guide rails 61 and restrict movement of each of the cleaning holders 511 and 512 toward the one side (side X1) in the extending direction. The stopper 62 is fixed to the upper surface of the cover portion 12*c*. In the present embodiment, the stopper 62 includes two stoppers 62, of which one is disposed on one of two guide rails 61 straddled by the cleaning holder 511, and of which the other is disposed on one of two guide rails 61 straddled by the cleaning holder 512. The two stoppers 62 extend in the juxtaposition direction of the transmissive members 52 (in direction Y).

The cleaning holders 511 and 512 are disposed on the upper surface (the surface on the side of the photosensitive drums 11*a* to 11*d*) of the cover portion 12*c*, and each include a main body portion 51*a*, an engagement portion 51*b*, and respectively a first light blocking portion 511*a* and a second light blocking portion 512*a*. The main body portion 51*a* is formed in a plate shape, and extends in the juxtaposition direction (direction Y) of the transmissive members 52 so as to straddle corresponding two adjacent ones of the transmissive members 52.

The cleaning member 53 is fixed to a lower surface of the main body portion 51*a* (see FIG. 5). As the cleaning member 53, a pair of cleaning members 53 are disposed inward of the engagement portion 51*b* in the juxtaposition direction (in direction Y). Each of the cleaning members 53, along with loop traveling of the linear member 54, slides on an upper surface (a surface on the side of the photosensitive drums 11*a* to 11*d*) of a corresponding one of the transmissive members 52. In this manner, the upper surfaces of the transmissive members 52 are simultaneously cleaned, each by a corresponding one of the cleaning members 53.

The cleaning members 53 are each a rubber pad, for example. A material usable for the rubber pads is silicone rubber, for example. Each of the cleaning holders 511 and 512 is formed of a resin, for example. Note that each of the cleaning members 53 is not limited to a rubber pad and may instead be made of a non-woven fabric, for example.

As the engagement portion 51*b*, a pair of engagement portions 51*b* are disposed one on each of opposite sides with a corresponding pair of the guide rails 61 therebetween. Each of the engagement portions 51*b* protrudes downward from a bottom surface of the main body portion 51*a*, with a leading end part thereof bent toward an adjacent one of the guide rails 61. The engagement portions 51*b* each engage with a corresponding one of the guide ribs 61*a*. The cleaning holders 511 and 512 are each guided along a corresponding pair of the guide rails 61. This enables the cleaning holders 511 and 512 to stably move on the transmissive members 52 along the extending direction (direction X).

Further, the engagement portions 51*b* are in engagement with the guide ribs 61*a*, and thus opposite ends of the main body portion 51*a* are respectively latched on the guide rails 61 in a direction (an upward direction in FIG. 5) away from the housing 12*a* of the optical scanning device 12. This makes it possible to restrict upward movements (positional deviation) of the cleaning holders 511 and 512 and thus to prevent them from coming off from the cover portion 12*c*. Thus, the cleaning members 53 are allowed to be stably in close contact with the transmissive members 52.

Further, the other side (side X2) of each of the guide rails 61 in the extending direction is open in the extending direction thereof (in direction X) (see FIGS. 6 and 7). This allows easy installation of the cleaning holders 511 and 512 on the guide rails 61 by bringing the engagement portions 51*b* into engagement with the guide ribs 61*a* from the other ends of the guide rails 61 in the extending direction thereof and sliding the cleaning holders 511 and 512 toward the one side (side X1) in the extending direction of the guide rails 61. Thus, the optical scanning device 12 can be assembled with improved workability.

Note that the engagement portions 51*b* and the guide ribs 61*a* are an example of engagement of the cleaning holders 511 and 512 with the cover portion 12*c*, and the present disclosure is not limited to this structure.

The first light blocking portion 511*a* is disposed, in the cleaning holder 511, at a side end part on one side (side Y1) of the main body portion 51*a* in the juxtaposition direction, and protrudes in a direction (direction X1) toward one side in the extending direction (see FIG. 6 and FIG. 7). The second light blocking portion 512*a* is disposed, in the cleaning holder 512, at a side end part on the other side (side Y2) of the main body portion 51*a* in the juxtaposition direction, and protrudes in the direction (direction X1) toward the one side in the extending direction (see FIG. 6 and FIG. 7). As to shapes of the first light blocking portion 511*a* and the second light blocking portion 512*a*, a detailed description will be given later.

The main body portion 51*a* has a concave portion 51*c* that is concave downward from an upper surface thereof, and the linear member 54 is fitted in the concave portion 51*c*. Further, the concave portion 51*c* has a protrusion portion 51*d* protruding inward from an internal side surface thereof. Due to the provision of the protrusion portion 51*d*, the linear member 54 is bent inside the concave portion 51*c*. In this manner, the cleaning holders 511 and 512 are robustly fixed to the linear member 54. Note that the concave portion 51*c* may instead be formed to be concave upward from the lower surface of the main body portion 51*a*.

The linear member 54 is a timing belt or a wire, for example. The linear member 54 is stretched in the housing 12*a* in a loop between four stretching pulleys 57 so as to pass between the two adjacent transmissive members 52 in each pair of the transmissive members 52. The linear member 54 extends between the two adjacent transmissive members 52 of each pair so as to be parallel to the extending direction (direction X) of the transmissive members 52. The four stretching pulleys 57 are rotatably held on the upper surface of the cover portion 12*c*.

Further, one of the stretching pulleys 57 is coupled to a gear 57*a* disposed on a lower surface of the cover portion 12*c* (see FIG. 6 and FIG. 7). The gear 57*a* is coupled to the motor 55. The motor 55 drives the gear 57*a* to rotate, and thereby the linear member 54 is driven to travel in a loop.

The motor (the drive portion) 55 is disposed outward of the linear member 54, and is also fixed to the lower surface of the cover portion 12*c*. That is, an upper end of the motor 55 is disposed below an upper end of the linear member 54. This makes it possible to reduce space on the upper surface of the cover portion 12*c*. Furthermore, by disposing the motor 55 outward of the linear member 54, it is possible to achieve improved workability in maintenance of the motor 55 and the gear 57*a*. The motor 55 is rotatable both forward and backward directions, and drives the linear member 54 to travel, in top view, in a loop in a clockwise direction (direction D2) or in a counterclockwise direction (direction D1) (see FIG. 6 and FIG. 7). As a result, the cleaning holders 511 and 512 reciprocate along the longitudinal directions of the transmissive members 52 (the main scanning direction of the laser light). Further, in their reciprocation movements, the cleaning holder 511 and the cleaning holder 512 linearly move in mutually opposite directions.

Note that a cleaning process is executed, when the image forming apparatus 1 is in a maintenance mode, in response to a user inputting process starting instructions via an operation portion 80 (see FIG. 10) or a host device such as a personal computer. Further, the cleaning process may also be executed periodically each time printing (image formation) is performed on, for example, about 10000 sheets.

The detection portion 56 is disposed on the one side (side X1) in the extending direction of the transmissive members 52 so as to be disposed between a movement path of the cleaning holder 511 and a movement path of the cleaning holder 512 in the juxtaposition direction (in direction Y) of the transmissive members 52 (see FIGS. 6 and 7). The detection portion 56 detects that one of the cleaning holders 511 and 512 has reached the one end part of its movement path. Note that each of the cleaning holders 511 and 512, on reaching the one end part of its movement path, comes into contact with a corresponding one of the stoppers 62, so that its movement toward the one side (side X1) in the extending direction is restricted.

The detection portion 56 is a transmissive optical sensor (a photo interrupter) that includes a light emitter 56*a* and a light receiver 56*b*, and is capable of detecting, with a single sensor, that the cleaning holder 511 or the cleaning holder 512 has reached the one end part of its movement path. The light emitter 56*a* emits light in the juxtaposition direction of the transmissive members 52 (in direction Y). The light receiver 56*b* receives light emitted from the light emitter 56*a*. Note that, although, in the present embodiment, the light emitter 56*a* is disposed more on the one side (side Y1) in the juxtaposition direction than the light receiver 56*b* is, the light emitter 56*a* may instead be disposed more on the other side (side Y2) in the juxtaposition direction than the light receiver 56*b* is.

Figure 8:
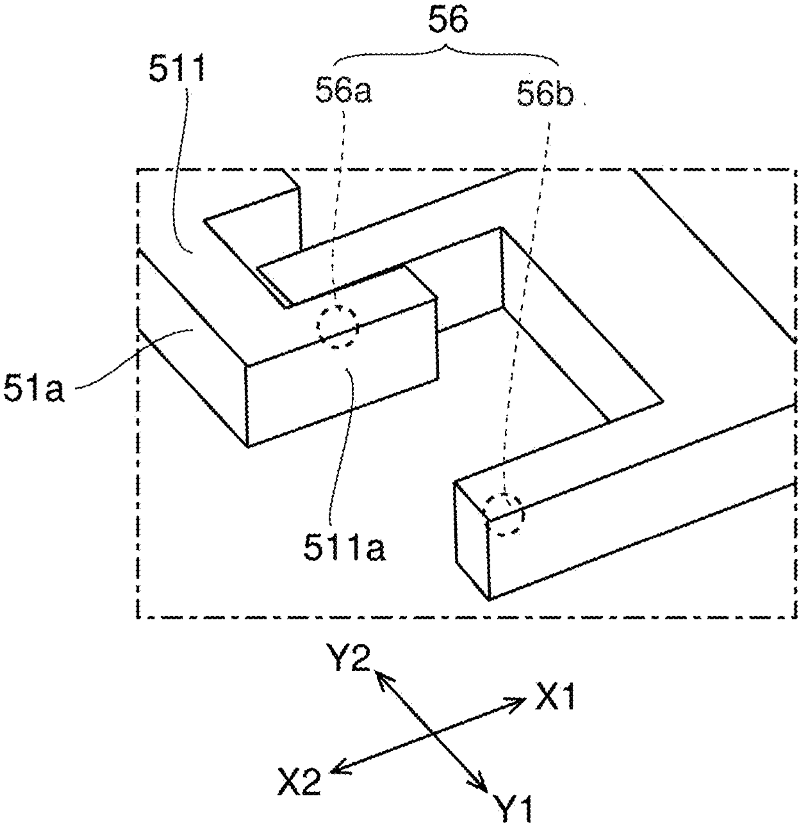
FIG. 8 is a schematic perspective view illustrating a positional relationship between the detection portion and a first light blocking portion of the optical scanning device according to the first embodiment.
Figure 9:
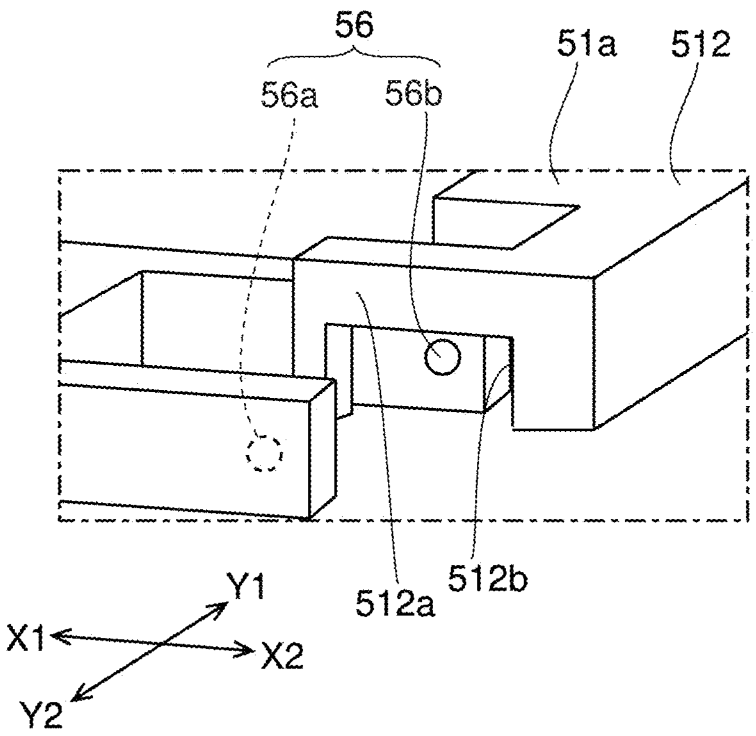
FIG. 9 is a schematic perspective view illustrating a positional relationship between the detection portion and a second light blocking portion of the optical scanning device according to the first embodiment.

Next, with reference to FIG. 8 and FIG. 9, a description will be given of the detection portion 56 and the first and second light blocking portions 511*a* and 512*a*. FIG. 8 and FIG. 9 are perspective views schematically illustrating the detection portion 56 and the first and second light blocking portions 511*a* and 512*a*. FIG. 8 illustrates a positional relationship between the detection portion 56 and the first light blocking portion 511*a*, and FIG. 9 illustrates a positional relationship between the detection portion 56 and the second light blocking portion 512*a*.

The first light blocking portion 511*a* and the second light blocking portion 512*a* have different shapes. In the present embodiment, the second light blocking portion 512*a* has a through hole 512*b* formed therein to penetrate therethrough in the juxtaposition direction (direction Y) (see FIG. 9), but in the first light blocking portion 511*a*, no through hole 512*b* is formed (see FIG. 8).

As a result, when the cleaning holder 511 or the cleaning holder 512 reaches the one end part of its movement path, depending on whether the first light blocking portion 511*a* has reached or the second light blocking portion 512*a* has reached, the light receiver 56*b* receives light in different patterns.

Specifically, when a leading end part of the first light blocking portion 511*a* moving toward the one side (side X1) in the extending direction is inserted between the light emitter 56*a* and the light receiver 56*b*, light emitted from the light emitter 56*a* is blocked by the leading end part of the first light blocking portion 511*a*. As a result, the light receiver 56*b* becomes unable to receive light emitted from the light emitter 56*a*. At this time, the detection portion 56 is turned into an ON state. Furthermore, by moving the first light blocking portion 511*a* toward the one side (side X1) in the extending direction, the cleaning holder 511 reaches the one end part in its movement path to make contact with the corresponding one of the stoppers 62. As a result, the movement of the cleaning holder 511 is restricted in the direction toward the one side (side X1) in the extending direction. At this time, light emitted from the light emitter 56*a* is blocked by the first light blocking portion 511*a*, and the detection portion 56 is maintained in the ON state (see FIG. 8).

On the other hand, when a leading end part of the second light blocking portion 512*a* moving to the one side (side X1) in the extending direction is inserted between the light emitter 56*a* and the light receiver 56*b*, the light emitted from the light emitter 56*a* is blocked by the leading end part of the second light blocking portion 512*a*. As a result, the light receiver 56*b* becomes unable to receive light emitted from the light emitter 56*a*. At this time, the detection portion 56 is turned into the ON state. Furthermore, by moving the second light blocking portion 512*a* toward the one side (side X1) in the extending direction, the cleaning holder 512 reaches the one end part in its movement path to contact the corresponding one of the stoppers 62. As a result, the movement of the cleaning holder 512 is restricted in the direction toward the one side (side X1) in the extending direction. At this time, light emitted from the light emitter 56*a* passes through the through hole 512*b* to be received by the light receiver 56*b*, and the detection portion 56 switches to an OFF state (see FIG. 9).

In this manner, during execution of a cleaning mode, in the case where the On state of the detection portion 56 has been maintained for a predetermined time, the detection portion 56 detects that the cleaning holder 511 has reached the one end part of its movement path. Further, during execution of the cleaning mode, in the case where the detection portion 56 has switched to the OFF state after being maintained in the ON state for the predetermined time, the detection portion 56 detects that the cleaning holder 512 has reached the one end part of its movement path. At this time, the linear member 54 stops travelling. That is, when one of the cleaning holders 511 and 512 reaches the one end part of its movement path, so that its movement is restricted by the stopper 62, the other one of the cleaning holders 511 and 512 stops moving. This makes it possible to prevent the other one of the cleaning holders 511 and 512 from coming off from the guide rails 61 on the other side (side X2) of the guide rails 61 in the extending direction thereof where the guide rails 61 are open.

Next, referring back to FIG. 6 and FIG. 7, a description will be given of how the cleaning holders 511 and 512 operate. In the present embodiment, as mentioned previously, in one execution of the cleaning process, along the extending direction of the transmissive members 52 (direction X), a corresponding one of the cleaning members 53 reciprocates once. The description here will deal with a case where, during the cleaning process, a travelling direction of the linear member 54 changes from a direction (a first direction) indicated by arrow D1 to a direction (a second direction) indicated by arrow D2.

At a start of the cleaning process, the cleaning holder 511, at the one end of its movement path, holds the detection portion 56 in the ON state (see FIG. 6). At the start of the execution of the cleaning mode, by setting the state where the cleaning holder 511 is disposed at the one end part of its movement path as an initial position, the detection portion 56 is in the ON state and is able to detect the cleaning holder 511. This makes it possible to prevent occurrence of an initial error in the cleaning process.

When the cleaning process is started, the linear member 54 travels in the first direction indicated by arrow D1 (see FIG. 6). As a result, the cleaning holder 511 and the cleaning holder 512 move from their respective positions shown in FIG. 6 to their respective positions shown in FIG. 7, and the detection portion 56 detects that the cleaning holder 512 has reached the one end part of its movement path, and the linear member 54 is caused to stop travelling. Thereby, the cleaning holder 511 and the cleaning holder 512 stop moving.

Next, the motor 55 starts to rotate in an opposite direction, causing the linear member 54 to travel in the second direction (which is opposite to the first direction) indicated by arrow D2 (see FIG. 7). As a result, the cleaning holder 511 and the cleaning holder 512 move from their respective positions shown in FIG. 7 to their respective positions shown in FIG. 6, and the detection portion 56 detects that the cleaning holder 511 has reached the one end part of its movement path, and the linear member 54 is caused to stop travelling. Thereby, the cleaning holder 511 and the cleaning holder 512 stop operating.

FIG. 10 is a block diagram illustrating one example of a control path used in the image forming apparatus 1. Note that the image forming apparatus 1 is used with various controls executed on its various portions, and this results in a complex control path of the entire image forming apparatus 1. Hence, the description here will be focused on necessary part of the control path for implementation of the present disclosure.

A voltage control circuit 71, which is connected to a motor drive power supply 73, activates the motor drive power supply 73 in accordance with an output signal from the control portion 90. The motor drive power supply 73, in accordance with a control signal from the voltage control circuit 71, applies a predetermined drive voltage to the motor 55 disposed inside the optical scanning device 12.

In the operation portion 80, there are provided a liquid crystal display portion 81 and LEDs 82 that indicate various kinds of states, so as to indicate states of the image forming apparatus 1 and display conditions of image formation, how many sheets have been printed, etc. Various settings for the image forming apparatus 1 are made via a printer driver of the personal computer.

The control portion 90 at least includes a CPU (central processing unit) 91 as a central processor, a ROM (read-only memory) 92 which is a read-only storage portion, a RAM (random access memory) 93 which is a readable/writable storage portion, a timer 95, and an I/F (interface) 96 that transmits a control signal to various devices in the image forming apparatus 1 and receives an input signal from the operation portion 80.

The ROM 92 stores therein a control program for the image forming apparatus 1, data that stays unchanged during use of the image forming apparatus 1, such as numerical values necessary for controlling the image forming apparatus 1, and the like. The RAM 93 stores therein necessary data generated during control of the image forming apparatus 1, data temporarily required for controlling the image forming apparatus 1, and the like. The RAM 93 (or the ROM 92) further stores therein, for example, a voltage value (DUTY) applied to the motor 55 in each of later-described various operation modes of the cleaning holders 511 and 512 and a driving time of the motor 55 measured during cleaning of the transmissive members 52 of the optical scanning device 12, etc. The timer 95 measures the driving time of the motor 55.

According to the present embodiment, during the execution of the cleaning mode, when the detection portion 56 detects that one of the cleaning holders 511 and 512 has reached the one end part of its movement path, the linear member 54 is driven to start a forward travel operation, while, when the detection portion 56 detects that the other of the cleaning holders 511 and 512 has reached the one end part of its movement path, the linear member 54 is driven to start a backward travel operation. In other words, by the control portion 90 determining switching between the forward travel operation and the backward travel operation based on a detection result of the detection portion 56, it is possible to reduce load on the linear member 54 and to prevent the stretching pulleys 57 from being damaged.

Further, the first light blocking portion 511*a* and the second light blocking portion 512*a* have different shapes, and the second light blocking portion 512*a* has the through hole 512*b*. This enables the detection portion 56 to detect, on the basis of the pattern of light received by the light receiver 56*b*, which of the cleaning holders 511 and 512 has reached the one end part of its movement path. Thus, it is possible to simplify the detection portion 56 so as to reduce production cost of the optical scanning device 12.

Further, by forming the through hole 512*b* in the second light blocking portion 512*a*, it becomes easy to detect which of the cleaning holders 511 and 512 has reached the one end Further, at the start of the execution of the cleaning mode, by setting the state where the cleaning holder 511 is disposed at the one end part of its movement path as the initial position, it is possible to have the detection portion 56 in the ON state so as to detect the cleaning holder 511. This makes it possible to prevent occurrence of an initial error in the cleaning process.

Further, on starting the execution of the cleaning mode, the control portion 90 determines, via the detection portion 56, which of the cleaning holders 511 and 512 is located at the one end part of its movement path, and decides which of the forward travel operation and the backward travel operation should be started. This enables a quick start-up of the cleaning operation no matter which of the cleaning holders 511 and 512 may be located at the one end part of its movement path when the previous execution of the cleaning mode is finished.

Figure 11:
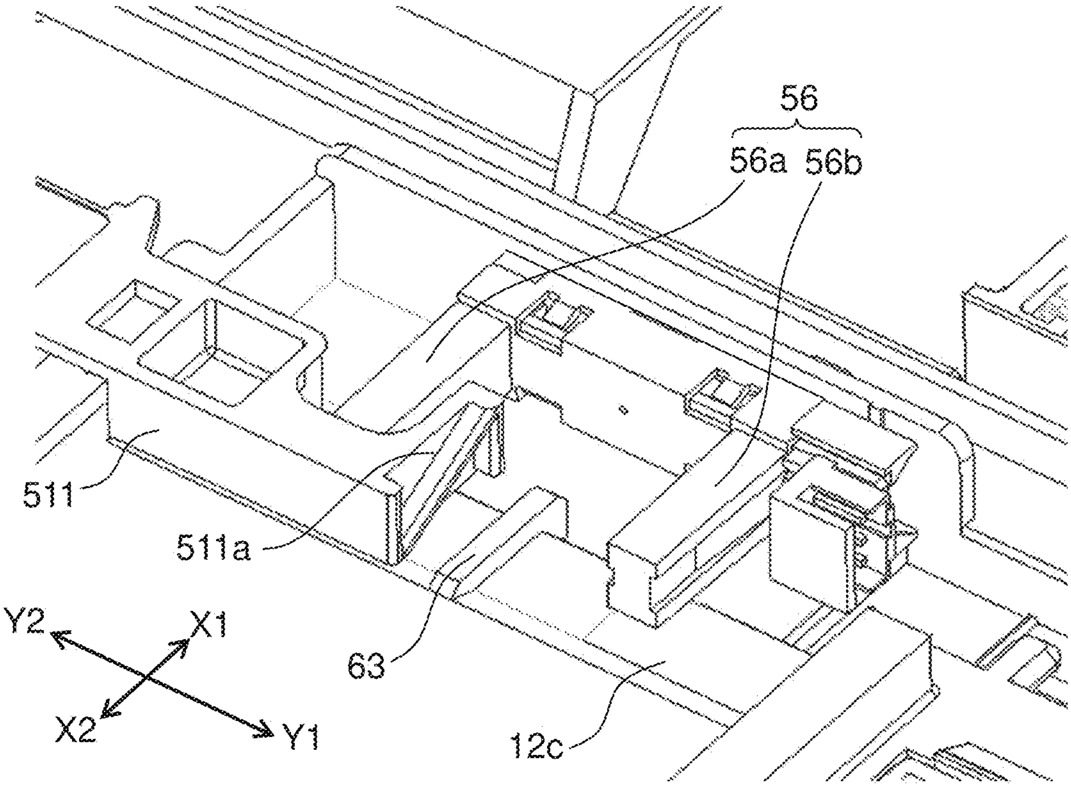
FIG. 11 is a perspective view illustrating a state where the detection portion of the optical scanning device according to the first embodiment is shielded from light by the first light blocking portion.
Figure 12:
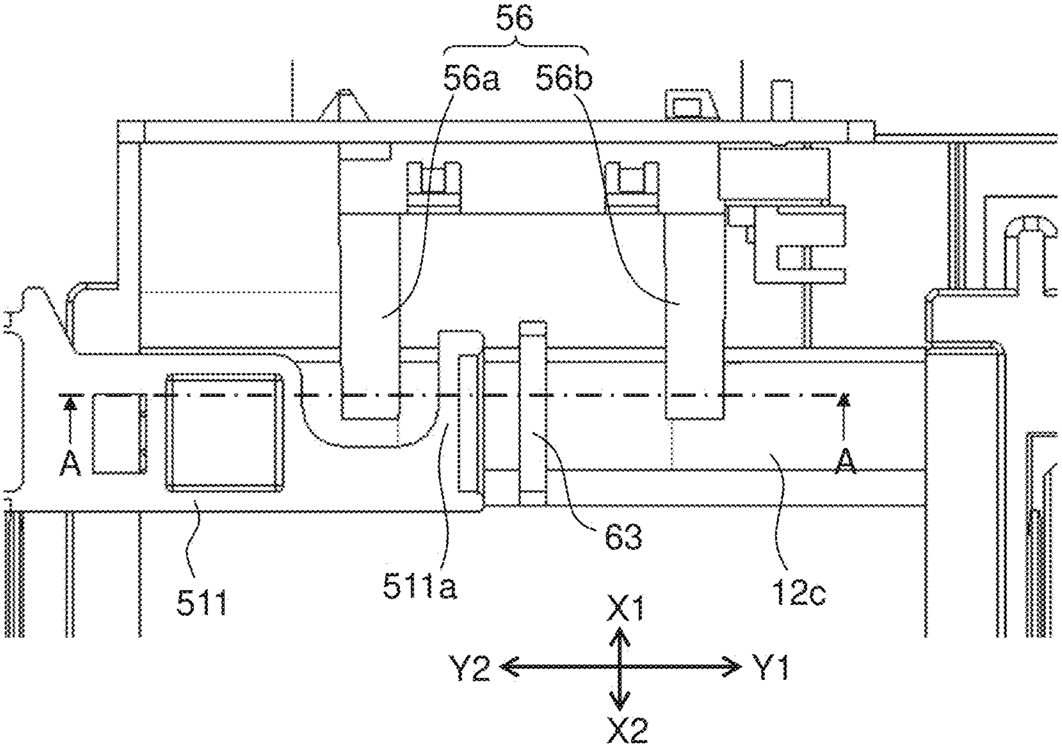
FIG. 12 is a plan view illustrating a state where the detection portion of the optical scanning device according to the first embodiment is shielded from light by the first light blocking portion.
Figure 13:
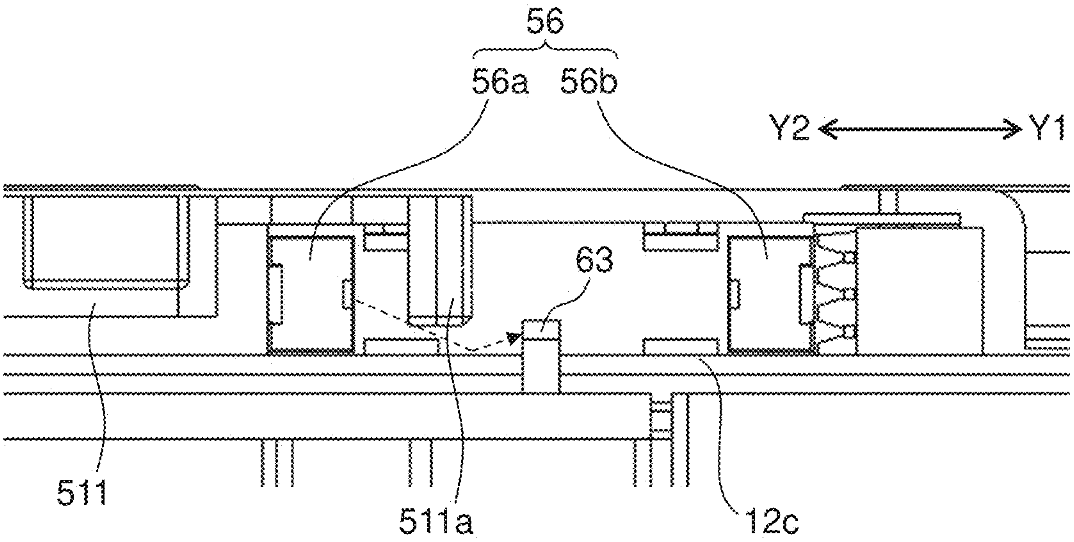
FIG. 13 is a sectional view illustrating a state where the detection portion of the optical scanning device according to the first embodiment is shielded from light by the first light blocking portion, as seen from the movement direction of the cleaning holder.

FIG. 11 and FIG. 12 are respectively a perspective view and a plan view illustrating a state where the detection portion 56 of the optical scanning device 12 according to the first embodiment is shielded from light by the first light blocking portion 511*a*. FIG. 13 is a sectional view (taken along line A-A of FIG. 12) as seen from the movement direction of the cleaning holder 511, illustrating a state where the detection portion 56 of the optical scanning device 12 according to the first embodiment is shielded from light by the first light blocking portion 511*a*.

As illustrated in FIG. 11, the detection portion 56 is disposed horizontally along the upper surface of the cover portion 12*c* such that longitudinal directions of the light emitter 56*a* and the light receiver 56*b* are parallel to the movement direction of the cleaning holder 511 (directions X1, X2). With this configuration, as compared to a case where the light emitter 56*a* and the light receiver 56*b* are disposed vertically, it is possible to reduce a protrusion amount of the detection portion 56 in its height direction and thus to achieve a reduced height (a lower profile) of the optical scanning device 12. On the other hand, with the above configuration, a distance from each of the light emitter 56*a* and the light receiver 56*b* to the upper surface of the cover portion 12*c* becomes short.

Further, as illustrated in FIG. 13, a gap is formed between the first light blocking portion 511*a* provided on the cleaning holder 511 and the upper surface of the cover portion 12*c*. This makes it possible to eliminate frictional resistance between the cleaning holder 511 and the upper surface of the cover portion 12*c* during movement of the cleaning holder 511 and thus to move the cleaning holder 511 smoothly.

As illustrated in FIG. 12 and FIG. 13, the first light blocking portion 511*a* of the cleaning holder 511 is disposed closer to the light emitter 56*a* than is a central part between the light emitter 56*a* and the light receiver 56*b* in a facing direction in which the light emitter 56*a* and the light receiver 56*b* face each other. Thus, with the first light blocking portion 511*a* of the cleaning holder 511 blocking an optical path between the light emitter 56*a* and the light receiver 56*b*, light emitted from the light emitter 56*a* passes through the gap between the first light blocking portion 511*a* and the cover portion 12*c*.

As a result, light having passed through the gap between the first light blocking portion 511*a* and the cover portion 12*c* may be reflected by the upper surface of the cover portion 12*c* to enter the light receiver 56*b*, leading to degradation in detection accuracy of the detection portion 56.

To prevent this, in the present embodiment, a light blocking rib 63 (a light leakage prevention portion) is formed on the upper surface of the cover portion 12*c*, which extends along the facing direction (directions Y1, Y2) of the light emitter 56*a* and the light receiver 56*b* of the detection portion 56, so as to be disposed in a region that faces a space between the light emitter 56*a* and the light receiver 56*b*. The light blocking rib 63 protrudes upward from the cover portion 12*c* substantially at the central part between the light emitter 56*a* and the light receiver 56*b* in the facing direction. In other words, the light blocking rib 63 protrudes on a side (a side of the light receiver 56*b*) that is opposite to the light emitter 56*a* with respect to the first light blocking portion 511*a*.

Figure 14:
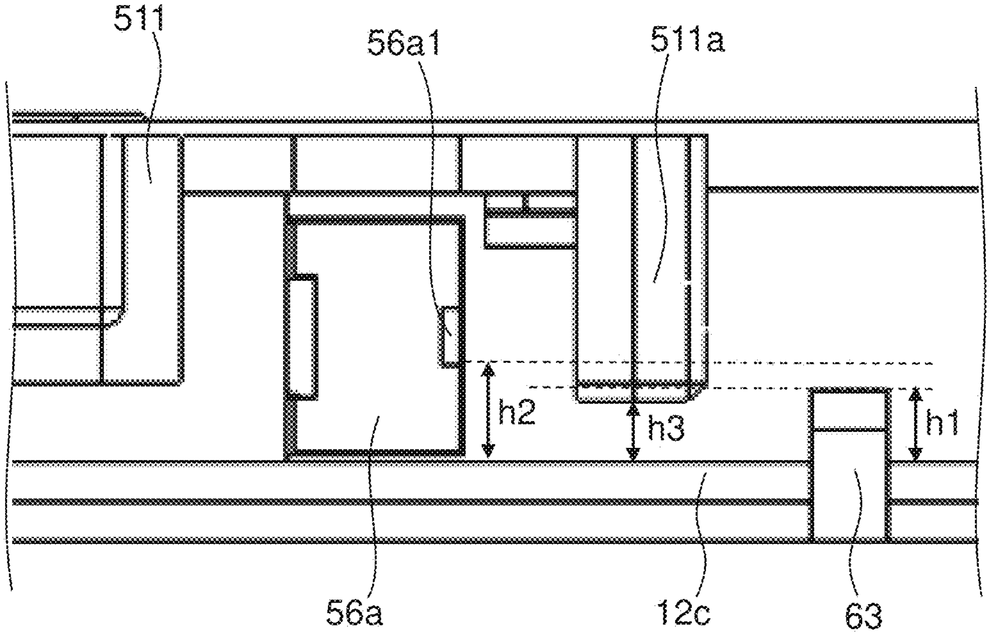
FIG. 14 is an enlarged view illustrating a positional relationship, in height a direction, among a light emitter, the first light blocking portion, and a light blocking rib in FIG. 13.

FIG. 14 is an enlarged view illustrating a positional relationship in height direction among the light emitter 56*a*, the first light blocking portion 511*a*, and the light blocking rib 63 in FIG. 13. As illustrated in FIG. 14, height h1 of the light blocking rib 63 from the upper surface of the cover portion 12*c* is set to be smaller than height h2 from the upper surface of the cover portion 12*c* to a lower end part of a light emitting region 56*al* of the light emitter 56*a*, and also to be equal to or greater than height h3 of the gap between the cover portion 12*c* and the first light blocking portion 511*a*. That is, height h1 of the light blocking rib 63 is determined so as to satisfy inequality (1) below:

$$h3 \leq h1 < h2. \quad (1)$$

When $h3 \leq h1$ is satisfied, the light blocking rib 63 is allowed to securely block light (indicated by a dashed-line arrow in FIG. 13) that has passed through the gap between the first light blocking portion 511*a* and the cover portion 12*c* to be reflected by the upper surface of the cover portion 12*c*. Further, when $h1 < h2$ is satisfied, there is no risk of the light blocking rib 63 blocking the optical path from the light emitter 56*a* to the light receiver 56*b*.

Note that, when the cleaning holder 512 has reached the one end part of its movement path, the second light blocking portion 512*a* of the cleaning holder 512 is inserted closer to the light receiver 56*b* than is the central part between the light emitter 56*a* and the light receiver 56*b* in the facing direction. In this case as well, light reflected by the upper surface of the cover portion 12*c* is blocked by the light blocking rib 63, and thus there is no risk of light reflected by the upper surface of the cover portion 12*c* passing through the gap between the second light blocking portion 512*a* and the cover portion 12*c* to enter the light receiver 56*b*.

Figure 15:
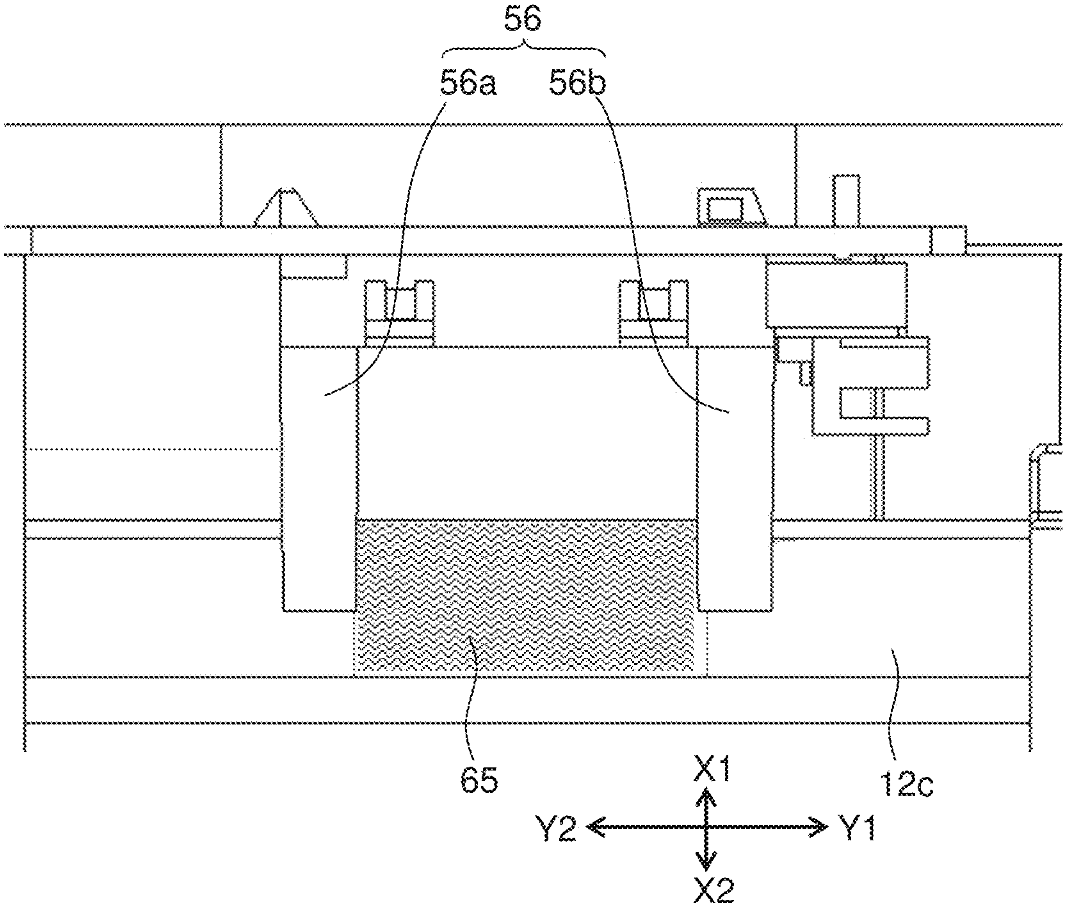
FIG. 15 is a plan view illustrating a configuration of and around a detection portion of an optical scanning device according to a second embodiment of the present disclosure.
Figure 16:
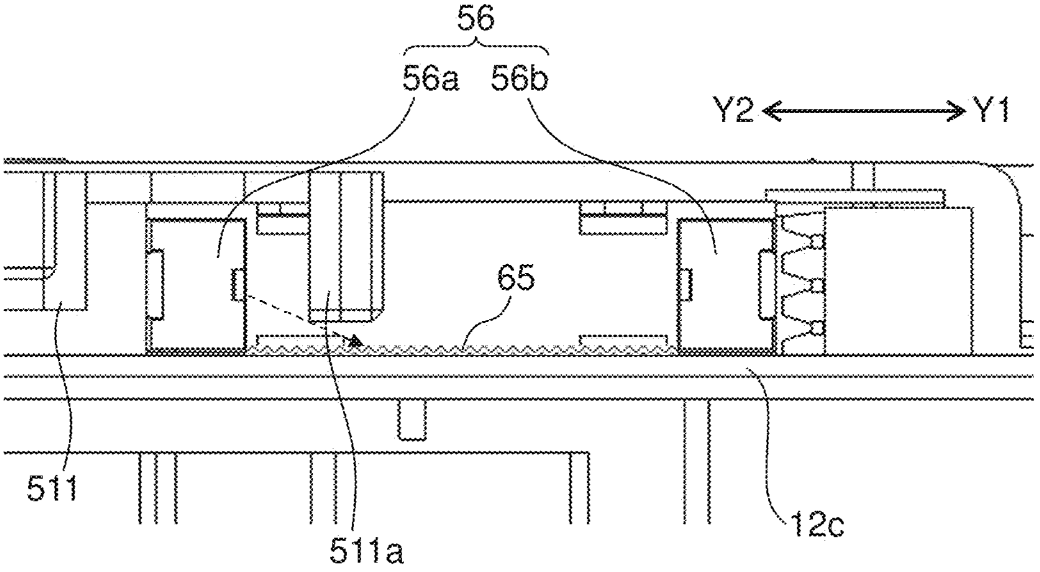
FIG. 16 is a sectional view illustrating a state where the detection portion of the optical scanning device according to the second embodiment is shielded from light by a first light blocking portion, as seen from a movement direction of a cleaning holder.

FIG. 15 is a plan view illustrating a configuration of and around a detection portion 56 of an optical scanning device 12 according to a second embodiment of the present disclosure. FIG. 16 is a sectional view illustrating a state where the detection portion 56 of the optical scanning device 12 according to the second embodiment is shielded from light by a first light blocking portion 511*a*, as seen from the movement direction of a cleaning holder 511. In the present embodiment, instead of the light blocking rib 63 of the first embodiment, a coarse surface portion 65 (a reflection suppression portion) is formed in an upper surface of a cover portion 12*c* so as to face a space between a light emitter 56*a* and a light receiver 56*b*.

The coarse surface portion 65 is such that fine irregularities are formed throughout such part of the cover portion 12*c* as faces the space between the light emitter 56*a* and the light receiver 56*b*, and has a lower reflectivity than other parts of the cover portion 12*c*. The coarse surface portion 65 is formed by processing the upper surface of the cover portion 12*c* by granulating (pear-skin) treatment. Light that has passed through the gap between the first light blocking portion 511*a* and the cover portion 12*c* (the light being indicated by the dashed-line arrow of FIG. 16) is reflected by the coarse surface portion 65 to become scattered light scattered in irregular directions. Thus, it is possible to suppress degradation of the detection accuracy of the detection portion 56 due to entry of light into the light receiver 56*b* after passing through the gap between the first light blocking portion 511*a* and the cover portion 12*c*.

Figure 17:
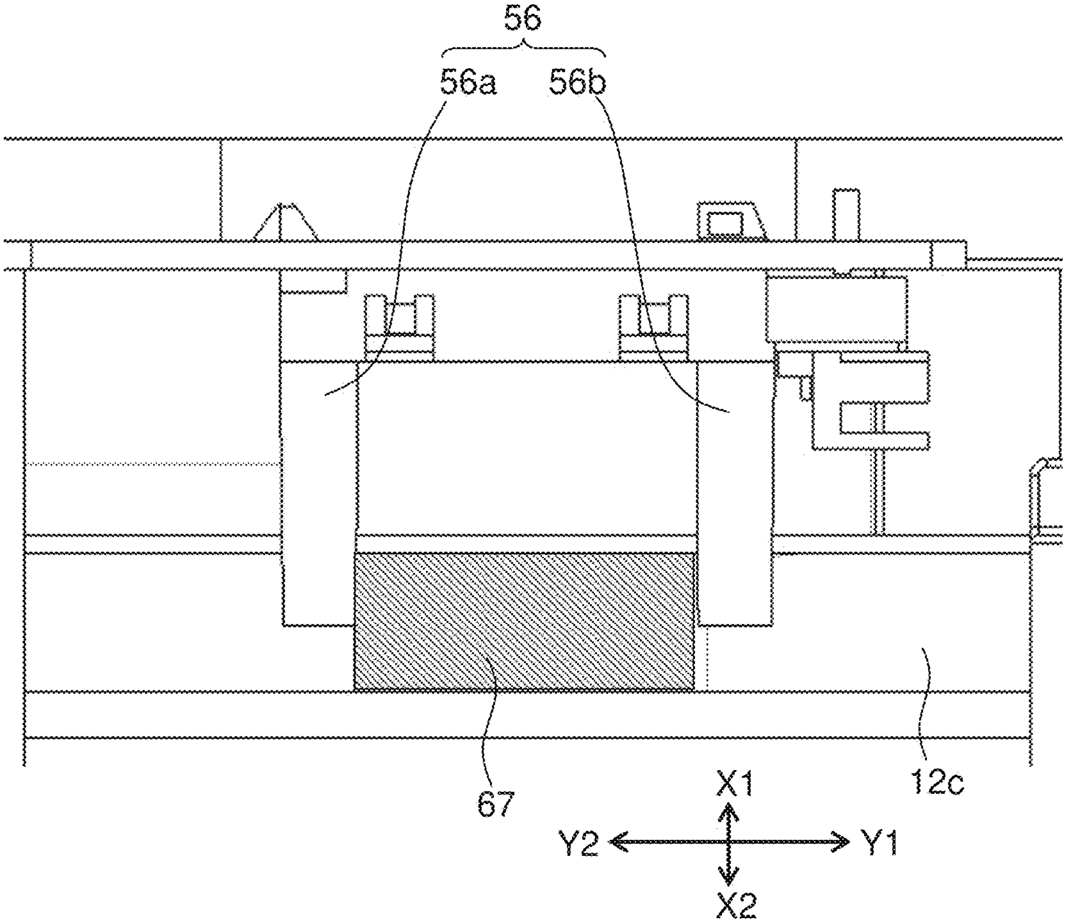
FIG. 17 is a plan view illustrating a configuration of and around a detection portion of an optical scanning device according to a third embodiment of the present disclosure.
Figure 18:
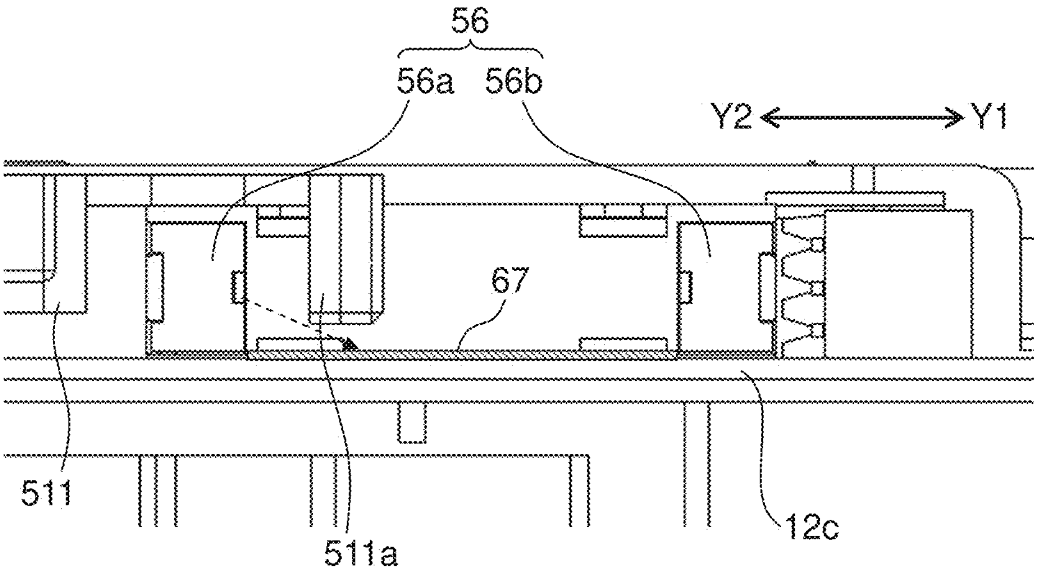
FIG. 18 is a sectional view illustrating a state where the detection portion of the optical scanning device according to the third embodiment is shielded from light by a first light blocking portion, as seen from a movement direction of a cleaning holder.

FIG. 17 is a plan view illustrating a configuration of and around a detection portion 56 of an optical scanning device 12 according to a third embodiment of the present disclosure. FIG. 18 is a sectional view illustrating a state where a detection portion 56 of the optical scanning device 12 according to the third embodiment is shielded from light by a first light blocking portion 511*a*, as seen from a movement direction of a cleaning holder 511. In the present embodiment, instead of the coarse surface portion 65 of the second embodiment, a reflection suppression sheet 67 (a reflection suppression portion) is attached to the upper surface of a cover portion 12*c* so as to face a space between a light emitter 56*a* and a light receiver 56*b*.

The reflection suppression sheet 67 is formed of a material having a lower reflectivity than the cover portion 12*c*, and is attached and fixed to the cover portion 12*c* to entirely cover such part of the cover portion 12*c* as faces the space between the light emitter 56*a* and the light receiver 56*b*. Light that has passed through the gap between the first light blocking portion 511*a* and the cover portion 12*c* (the light being indicated by the dashed-line arrow of FIG. 18) enters the reflection suppression sheet 67 to become scattered light scattered in irregular directions. Thus, as in the second embodiment, it is possible to suppress degradation of the detection accuracy of the detection portion 56 due to entry of light into the light receiver 56*b* after passing through the gap between the first light blocking portion 511*a* and the cover portion 12*c*. As the reflection suppression sheet 67, for example, a sheet (a granulated sheet) formed by granulating a surface of a resin film such as a polycarbonate film or the like, an ND filter (a neutral density filter), or the like can be used.

Besides, the present disclosure may be implemented in any other manner than specifically described above as embodiments, and various modifications are possible within the scope of the invention. For example, each of the embodiments described above has dealt with the optical scanning device 12 including a pair of the cleaning holders 511 and 512 that are driven to reciprocate in mutually opposite directions by traveling of the linear member 54, but the present disclosure is equally applicable to an optical scanning device 12 including a single cleaning holder.

Further, each of the embodiments described above has dealt with a tandem-type color printer as an example of the image forming apparatus 1 incorporating the optical scanning device 12, but the present disclosure is applicable, not limited to color printers, also to electrophotographic image forming apparatuses provided with the optical scanning device 12, such as color copiers, monochrome printers, monochrome copiers, digital multifunction peripherals, facsimile machines, and the like.

The present disclosure is usable in optical scanning devices that form an electrostatic latent image by irradiating an image carrier with light. By using the present disclosure, it is possible to provide an optical scanning device capable of preventing degradation of detection accuracy and maintaining smooth movement of a cleaning holder in a case where a transmissive detection portion is used, and an image forming apparatus including such an optical scanning device.

What is claimed is:

1. An optical scanning device that irradiates an image carrier with laser light so as to form an electrostatic latent image, the optical scanning device comprising:

a housing in which an emission port for the laser light is formed to extend in a main scanning direction of the laser light so as to correspond to the image carrier;

a transmissive member that is transmissive with respect to the laser light, extends in a main scanning direction of the laser light, and seals the emission port for the laser light;

a linear member that is stretched in a loop on the housing;

a drive portion that drives the linear member to travel in a predetermined direction;

a guide rail that is juxtaposed with the emission port and extends in an extending direction of the transmissive member;

a cleaning holder that is fixed to the linear member and, when the linear member is driven to travel by the drive portion, moves over the transmissive member along the guide rail;

a cleaning member that is fixed to the cleaning holder and slides with respect to the transmissive member along with movement of the cleaning holder to thereby clean the transmissive member;

a detection portion that is disposed on one side in the extending direction of the transmissive member so as to detect that the cleaning holder has reached one end part of a movement path of the cleaning holder; and a control portion that controls driving of the drive portion, wherein the detection portion includes:

a light emitter that emits light in a juxtapositional direction of the transmissive member; and a light receiver that receives light emitted from the light emitter, and is disposed along the housing such that longitudinal directions of the light emitter and the light receiver are parallel to a movement direction of the cleaning holder, the cleaning holder includes a light blocking portion that is located, when the cleaning holder reaches the one end part of the movement path thereof, between the light emitter and the light receiver so as to block light emitted from the light emitter, with a gap formed between the light blocking portion and the housing, and the housing includes a light leakage prevention portion formed between the light emitter and the light receiver.

2. The optical scanning device according to claim 1, wherein the light leakage prevention portion is a light blocking rib that protrudes from the housing into a space between the light emitter and the light receiver.

3. The optical scanning device according to claim 2, wherein where h1 represents a protrusion height of the light blocking rib from the housing, h2 represents a height from the housing to a light emitting region of the light emitter, and h3 represents a gap between the housing and the light blocking portion, expression (1) below is satisfied:

$$h3 \leqq h1 < h2. \qquad (1)$$

4. The optical scanning device according to claim 2, wherein the cleaning holder includes a pair of the cleaning holders that move in mutually opposite directions respectively over adjacent ones of a plurality of the transmissive members along the guide rail when the linear member is driven to travel by the drive portion, one of the pair of the cleaning holders includes a first light blocking portion as the light blocking portion, while an other of the pair of the cleaning holders includes a second light blocking portion that is different from the first light blocking portion in shape, when the one of the cleaning holders has reached one end part of a movement path thereof, the first light blocking portion is located between the light emitter and the light blocking rib, and when the other of the cleaning holders has reached one end part of a movement path thereof, the second light blocking portion is located between the light blocking rib and the light receiver.

5. The optical scanning device according to claim 1, wherein the light leakage prevention portion is a reflection suppression portion that is formed throughout such part of the housing as faces a space between the light emitter and the light receiver and that has a lower reflectivity than other parts of the housing.

6. The optical scanning device according to claim 5, wherein the reflection suppression portion is a coarse surface portion where fine irregularities are formed on a surface of the housing.

7. The optical scanning device according to claim 5, wherein the reflection suppression portion is a reflection suppression sheet that is attached and fixed to a surface of the housing and that has a lower reflectivity than the housing.

8. An image forming apparatus, comprising:

an image forming portion that includes one or more image carriers; and the optical scanning device according to claim 1 which irradiates the image carrier with laser light so as to form an electrostatic latent image.

* * * * *